United States Patent
Gosis et al.

(10) Patent No.: US 6,840,146 B2
(45) Date of Patent: *Jan. 11, 2005

(54) ROTARY TORSION CUTTING APPARATUS

(75) Inventors: Anatoly Gosis, Palatine, IL (US);
Thomas J. Nelson, Belton, TX (US);
Lee A. Sheridan, Barrington, IL (US);
G. Michael Velan, Mount Prospect, IL (US)

(73) Assignee: Aremark RWP Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/385,669

(22) Filed: Mar. 12, 2003

(65) Prior Publication Data

US 2003/0140752 A1 Jul. 31, 2003

Related U.S. Application Data

(63) Continuation-in-part of application No. 09/682,515, filed on Sep. 13, 2001, now Pat. No. 6,553,878.

(51) Int. Cl.$^7$ ................................................. B26D 1/00
(52) U.S. Cl. ........................................................ 83/199
(58) Field of Search ........................... 83/199, 196, 200

(56) References Cited

U.S. PATENT DOCUMENTS

| | | | | |
|---|---|---|---|---|
| 65,248 A | * | 5/1867 | Lyon ............................ | 83/200 |
| 146,846 A | * | 1/1874 | Stevens ........................ | 83/200 |
| 464,976 A | * | 12/1891 | Lindfors ....................... | 83/200 |
| 649,850 A | * | 5/1900 | Levalley ....................... | 83/199 |
| 690,083 A | * | 12/1901 | Stolpe ........................... | 83/199 |
| 1,216,426 A | * | 2/1917 | Erickson ....................... | 83/199 |
| 1,265,345 A | * | 5/1918 | La Rock ....................... | 83/200 |
| 2,638,985 A | | 5/1953 | Ross ............................. | 164/40 |
| 3,494,233 A | | 2/1970 | Kojima ......................... | 83/199 |
| 4,958,434 A | | 9/1990 | Marschner .................... | 30/101 |
| 6,553,878 B2 | * | 4/2003 | Gosis et al. .................. | 83/199 |

* cited by examiner

Primary Examiner—Allan N. Shoap
Assistant Examiner—Jason Prone
(74) Attorney, Agent, or Firm—Welsh & Flaxman LLC

(57) ABSTRACT

A rotary torsion cutting apparatus is provided for cutting an article. The cutting apparatus includes a first plate member having a front face, a back face and a side face. The first plate member further includes a central axis and a first opening extending from the front face to the back face of the first plate member. The first opening is shaped and dimensioned for receiving an article to be cut by the rotary torsion cutting apparatus. The cutting apparatus also includes a second plate member having a front face, a back face and a side face. The second plate member further includes a central axis aligned with the central axis of the first plate member and a second opening extending from the front face to the back face of the second plate member. The second opening is shaped and dimensioned for receiving an article to be cut by the rotary torsion cutting apparatus. In addition, the second plate member is rotationally supported upon the first plate member for rotation relative thereto about a complete revolution. The first opening and the second opening are of substantially the same shape and are aligned for simultaneous positioning of an article within both the first opening and the second opening. Relative movement between the first plate member and the second plate member causes a torsion cutting of an article positioned within the first opening and the second opening.

18 Claims, 6 Drawing Sheets

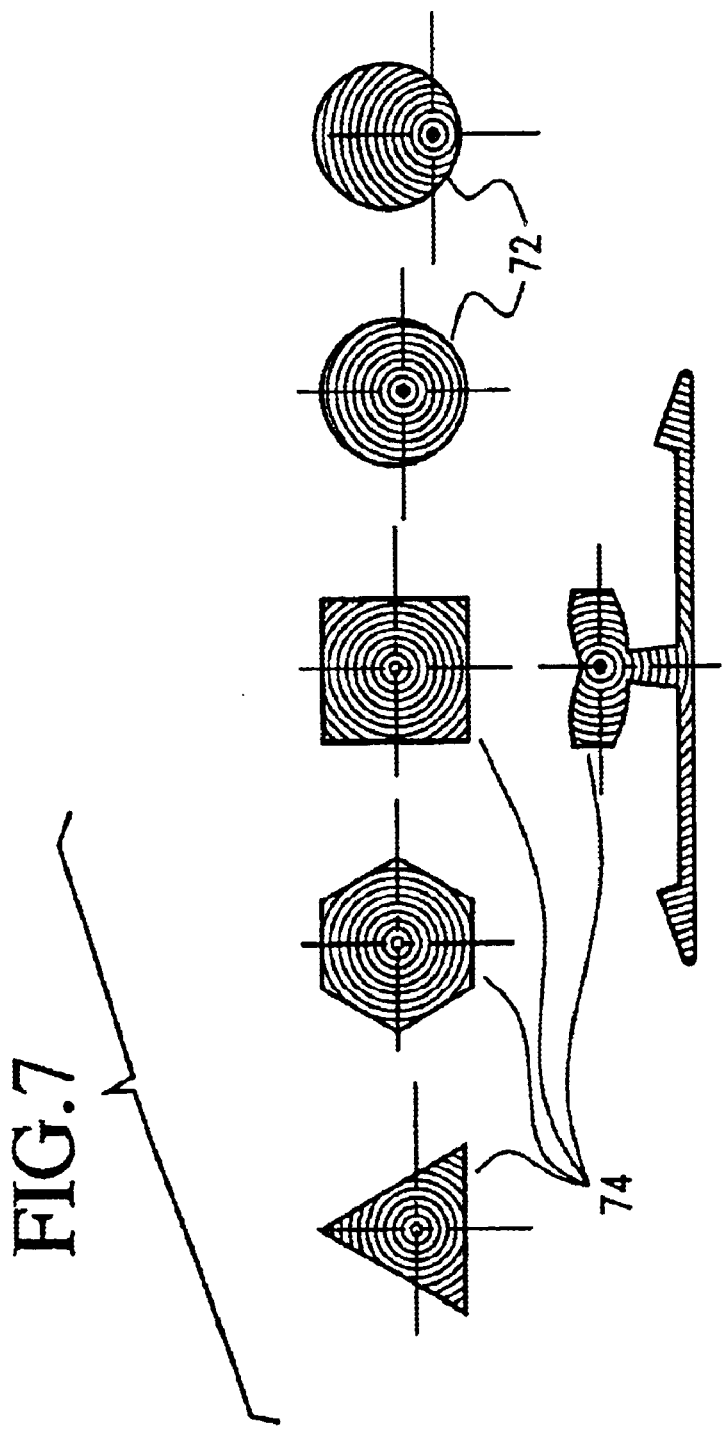

US 6,840,146 B2

ROTARY TORSION CUTTING APPARATUS

CROSS REFERENCE TO RELATED APPLICATIONS

This application is a continuation-in-part of U.S. patent application Ser. No. 09/682,515, entitled "ROTARY TORSION CUTTING APPARATUS", filed Sep. 13, 2001 now U.S. Pat. No. 6,553,878 which is currently pending and incorporated herein by reference.

BACKGROUND OF THE INVENTION

1. Field of the Invention

The present invention relates to a cutting apparatus. More particularly, the present invention relates to a rotary torsion cutting apparatus for cutting an article without deformation, deflection or burring of the article.

2. Description of the Prior Art

Most mechanics, professional installers and even "do it yourselfer's" have come across the need to cut metal stock or PVC pipe. For example, it is common when installing a typical suspended ceiling that the metal tracks supporting the ceiling tile must be cut. Even physicians employ cutting devices when sizing metal tubes, and the like, for implant into the human body. In these situations, there is a strong desire to find a tool which will handle the cutting in a simple, fast and economical manner.

In addition to seeking out a cutting device capable of providing a simple, fast and economical cut, many applications require that the cut end of the stock material be substantially undistorted, retaining the profile of the stock material prior to cutting. For example, a system such as that disclosed in U.S. Pat. No. 6,460,306, to Nelson, requires that the profile of the elongated connector be unchanged so that flooring planks will readily engage the connector at all points thereof (even along the cut edge). Burring or distortion of the cut edges of the connector is, therefore, considered to be entirely unacceptable.

Cutting devices are well known in the art and range in complexity from very simple to extremely elaborate. They are used in a variety of applications, including, but not limited to, the medical, construction, plumbing and electrical fields. Scissors are an example of a simple cutting device and are considered to include any cutting device wherein a pair of rods rotates around a fixed pivot point. The handles are positioned at one end of the rods, while the blades which accomplish the cutting are positioned at the other end of the rods. Generally, material is placed between the blades of the scissors, at least one of which has been sharpened to a cutting edge and is offset from the other. The blades are then closed together using the handles. The motion shears the material placed between the blades. As such, scissors and cutting devices similar thereto are commonly referred to as employing a "shearing" type mechanism.

It is well known in the art that shearing type devices, for example, scissors, are often constructed with slightly bowed cutting blades such that only a single contact point is maintained as the blades move relative to each other while cutting an object. The single contact point moves along the blades as the blades are brought together while cutting. In addition to assisting in the cutting action of shearing type devices, the use of bowed blades creates a gap between the blades. The gap extends from the pivot point of the device to the single contact point which moves along the blades during the cutting action. The provision of a gap limits friction between the blades and minimizes the force required to move the blades. If one were to construct a shearing type device without a gap, the force necessary to move the blades relative to each other would render the cutting device practically useless. A severe disadvantage of the gap is the burring which results on the cut edge, as well as possible sources of material that may foul the cutting device.

Further complicating the structure and operation of prior art cutting devices is the fact that a rotational bearing is generally required to perform a cut. The inclusion of a rotational bearing necessitates a housing feature. Examples of this type of cutting device are found in the disclosures of U.S. Pat. No. 5,261,303 to Strippgen, U.S. Pat. No. 4,958,434 to Marschner, U.S. Pat. No. 3,494,233 to Kojima and U.S. Pat. No. 2,638,985 to Ross.

As such, a need exists for a cutting apparatus capable of cutting without the creation of burrs, the problems associated with fouling and the need for a housing. The present invention provides such a cutting apparatus. Unlike prior art cutting devices, the present invention utilizes a rotary torsion mechanism to achieve the requisite mechanical force necessary to cut an article. Torsion cutting in accordance with the present invention requires substantially less force than is required by cutting implements employing a shearing mechanism. Further, and unlike the prior art cutting devices, the present cutting apparatus eliminates burring, prevents fouling, eliminates the need for a housing (consequently any bearing feature) and eliminates the need for any offset (in all cases except for cutting round material). In addition, the present cutting apparatus does not limit the range of rotational movement used in cutting and the present cutting apparatus is, therefore, well adapted for cutting a wide variety of materials regardless of the cutting characteristics (i.e., whether the cut material is soft (requiring greater rotational movement) or hard (requiring limited rotational movement)) of the material.

SUMMARY OF THE INVENTION

It is, therefore, an object of the present invention to provide a rotary torsion cutting apparatus for cutting an article. The cutting apparatus includes a first plate member having a front face, a back face and a side face. The first plate member further includes a central axis and a first opening extending from the front face to the back face of the first plate member. The first opening is shaped and dimensioned for receiving an article to be cut by the rotary torsion cutting apparatus. The cutting apparatus also includes a second plate member having a front face, a back face and a side face. The second plate member further includes a central axis aligned with the central axis of the first plate member and a second opening extending from the front face to the back face of the second plate member. The second opening is shaped and dimensioned for receiving an article to be cut by the rotary torsion cutting apparatus. In addition, the second plate member is rotationally supported upon the first plate member for rotation relative thereto about a complete revolution. The first opening and the second opening are of substantially the same shape and are aligned for simultaneous positioning of an article within both the first opening and the second opening. Relative movement between the first plate member and the second plate member causes a torsion cutting of an article positioned within the first opening and the second opening.

It is also an object of the present invention to provide a rotary torsion cutting apparatus including a first plate member having a front face, a back face and a side face. The first plate member includes a first opening extending from the front face to the back face of the first plate member, wherein the first opening is shaped and dimensioned for receiving an article to be cut by the rotary torsion cutting apparatus. The cutting apparatus also includes a cylindrical, second plate member having a front face, a back face and a side face. The second plate member includes a second opening extending from the front face to the back face of the second plate member, wherein the second opening is shaped and dimensioned for receiving an article to be cut by the rotary torsion cutting apparatus. A fastening mechanism movably holds the back face of the first plate member in contact with the front face of the second plate member. The fastening mechanism includes a plurality of support members engaging the side face of at least one of the first plate member or the second plate member. Relative movement between the first plate member and the second plate member causes a torsion cutting of an article positioned within the first opening and the second opening.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 7 shows cutting patterns generated with articles having various cross sectional profiles.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

Figure 1:
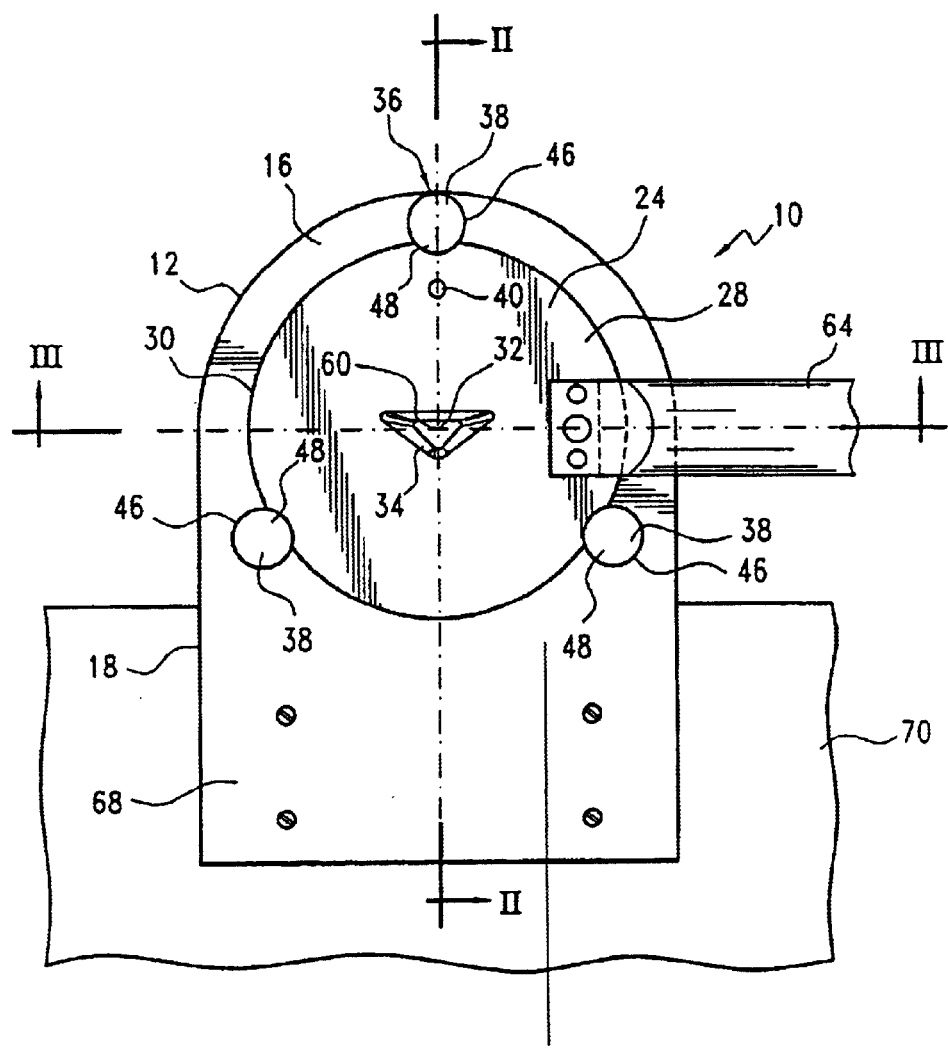
FIG. 1 is a front plan view of the cutting apparatus in accordance with the present apparatus.
Figure 2:
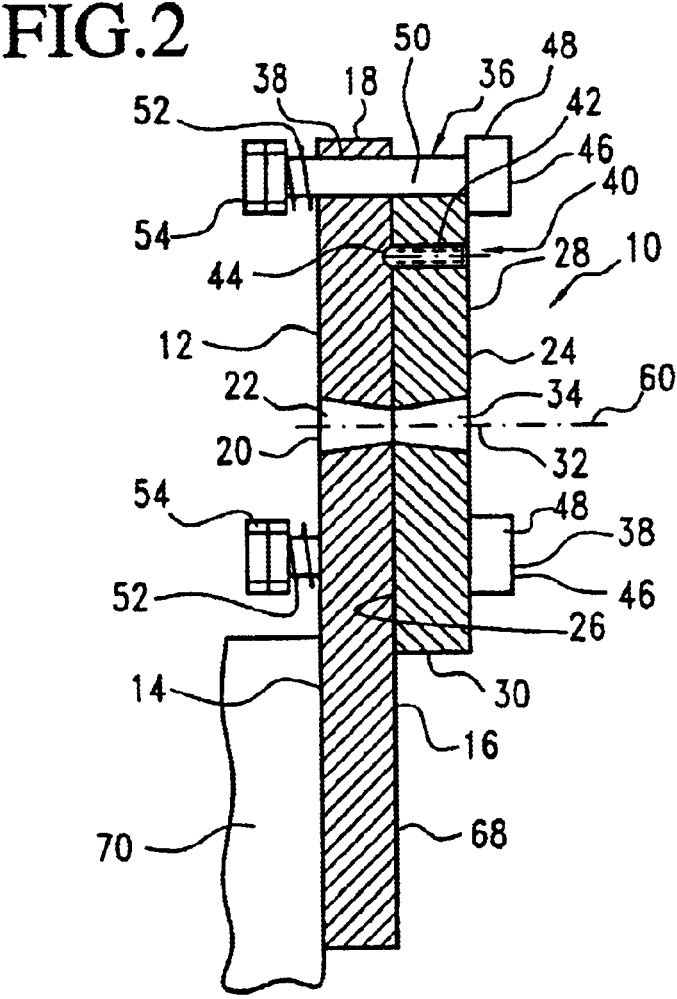
FIG. 2 is a cross sectional view along the line II—II in FIG. 1.
Figure 3:
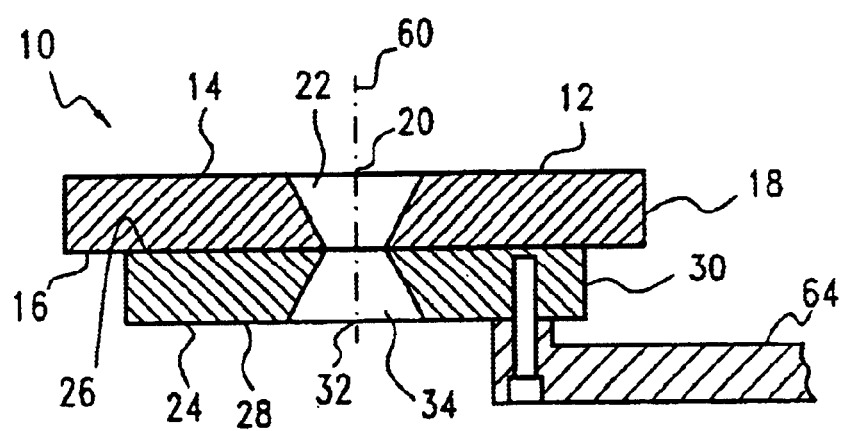
FIG. 3 is a cross sectional view along the line III—III in FIG. 1.

With reference to FIGS. 1 to 3, a rotary torsion cutting apparatus 10 is disclosed. The cutting apparatus 10 is designed for cutting an article without deformation, deflection or burring of the article.

The cutting apparatus 10 includes a first plate member 12 having a front face 14, a back face 16 and a side face 18. The first plate member 12 further includes a central axis 20 and a first opening 22 extending between the front face 14 and the back face 16 of the first plate member 12. The first opening 22 is shaped and dimensioned for receiving an article to be cut by the rotary torsion cutting apparatus 10. The cutting apparatus 10 also includes a second plate member 24 having a front face 26, a back face 28 and a side face 30. The second plate member 24 further includes a central axis 32 aligned with the central axis 20 of the first plate member 12 and a second opening 34 extending from the front face 26 to the back face 28 of the second plate member 24. The second opening 34 is also shaped and dimensioned for receiving an article to be cut by the rotary torsion cutting apparatus 10, and is, therefore, substantially identical to the first opening 22 of the first plate member 12.

The second plate member 24 is rotationally supported upon the first plate member 12 for free rotation relative thereto. As such, the first and second plate members 12, 24 are free to rotate relative to each other in complete revolutions.

While the first plate member 12 and the second plate member 24 may be constructed in a variety of shapes without departing from the spirit of the present invention, cylindrical shapes have been chosen in accordance with a preferred embodiment of the present invention. In particular, and for reasons that will become apparent based upon the following disclosure, the second plate member 24 is cylindrical and has a smooth, round outer periphery. Similarly, the first plate member 12 is shaped for aesthetic reasons to correspond to the general shape of the second plate member 24. However, and as will be discussed below in greater detail, the first plate member 12 is provided with a depending flange 68 shaped and dimensioned for attachment to a support surface 70 upon which the cutting apparatus 12 is held during usage.

The first opening 22 and the second opening 34 are of substantially the same shape and are aligned with the central axis 20 of the first plate member 12 and the central axis 32 of the second plate member 24 such that the central axes 20, 32 of the first plate member 12 and the second plate member 24 extend through the first opening 22 and the second opening 34. In use, relative movement between the first plate member 12 and the second plate member 24 causes torsion cutting of an article positioned within the first opening 22 and the second opening 34. With this in mind, the openings 22, 34 are shaped to very closely correspond to the article being cut so as to minimize any play between the article and the openings 22, 34 when the article is placed therein for cutting.

More specifically, and in accordance with a preferred embodiment of the present invention, the first plate member 12 is held stationary and the second plate member 24 is mounted thereon for rotation relative to the stationary, first plate member 12. As mentioned above, the rotating, second plate member 24 is generally cylindrical and is supported upon the first plate member 12 such that the front face 26 of the second plate member 24 faces the back face 16 of the first plate member 12. In fact, the front face 26 of the second plate member 24 sits directly upon the back face 16 of the first plate member 12 such that no gap, or a zero gap, exists between the first and second plate members 12, 24.

As discussed above, and in accordance with a preferred embodiment of the present invention, the first plate member 12 is stationary and the second plate member 24 rotates relative thereto. It has, however, been contemplated that the present cutting apparatus may be constructed such that both the first and second plate members move relative to each other. As such, other rotational mechanisms are certainly considered to be possible within the spirit of the present invention.

Unlike prior art cutting devices, which generally rely upon shear type cutting mechanisms, the present invention provides for a unique torsion cutting mechanism. Two plates, referred to as first and second plate members 12, 24, are positioned and held in place next to each other such that there is a zero gap between the first and second plate members 12, 24. A fastening mechanism 36 securely binds the first and second plate members 12, 24 together.

The fastening mechanism 36 includes a plurality of support members 38 maintaining the back face 16 of the first plate member 12 in contact with the front face 26 of the second plate member 24. The fastening mechanism 36, and ultimately the plurality of support members 38, hold the first and second plate members 12, 24 relative to each other such that the first and second openings 22, 34 are precisely aligned. With the exception of a cutting apparatus designed to cut cylindrical members (in which the first and second openings are aligned offset with the central axes 20, 32 of the first and second plate members 12, 24), the first and second openings 22, 34 are substantially aligned such that the centers of the first and second openings 22, 34 are aligned with the central axes 20, 32 of the first and second plate members 12, 24. Although such an alignment mechanism is disclosed in accordance with a preferred embodiment of the present invention, those skilled in the art will appreciate that other alignment mechanisms may be employed without departing from the spirit of the present invention.

Alignment of the first and second openings 22, 34 prior to the insertion of an article for cutting is achieved by the provision of an indexing device 40. The indexing device 40 is composed of a biased plunger 42 that seats within a recess 44 when the first and second openings 22, 34 are exactly aligned. In accordance with a preferred embodiment of the present invention, the plunger 42 is positioned within the second plate member 24 and is biased toward the back face 16 of the first plate member 12 in which the recess 44 is formed. When the first and second openings 22, 34 are aligned, the plunger 42 will seat within the recess 44 providing slight resistance to rotation and indicating to the operator that the first and second openings 22, 34 are aligned.

In accordance with a preferred embodiment of the present invention, each support member 38 includes a bearing member 46 bolted to the first plate member 12 for supporting the second plate member 24 for rotation relative thereto. The bearing members 46 are shaped, dimensioned and positioned for engaging the side face 30 of the second plate member 24. In particular, the bearing members 46 extend from the first plate member 12 and engage the side face 30 of the second plate member 24.

Engagement of the side face 30 of the second plate member 24 is achieved by providing the bearing members 46 with an outer ridge 48 having a diameter slightly greater than the bearing portion 50 of the bearing member 46 upon which side face 30 of the second plate member 24 sits. The ridge 48 is shaped and dimensioned to extend beyond the side face 30 of the second plate member 24 and wrap around into slight contact with the back face 28 of the second plate member 24.

The support members 38 are biased to draw the second plate member 24 toward the first plate member 12, ensuring that a zero gap exists between the first and second plate members 12, 24. A spring 52 is positioned between the retaining nut 54 and the first plate member 12 to bias the bearing members 46 toward the back face 16 of the first plate member 12. In this way, the ridge 48 of each bearing member 46 engages the back face 28 of the second plate member 24, pulling the second plate member 24 toward the back face 16 of the first plate member 12 to create and maintain a zero gap between the first and second plate members 12, 24.

Figure 8:
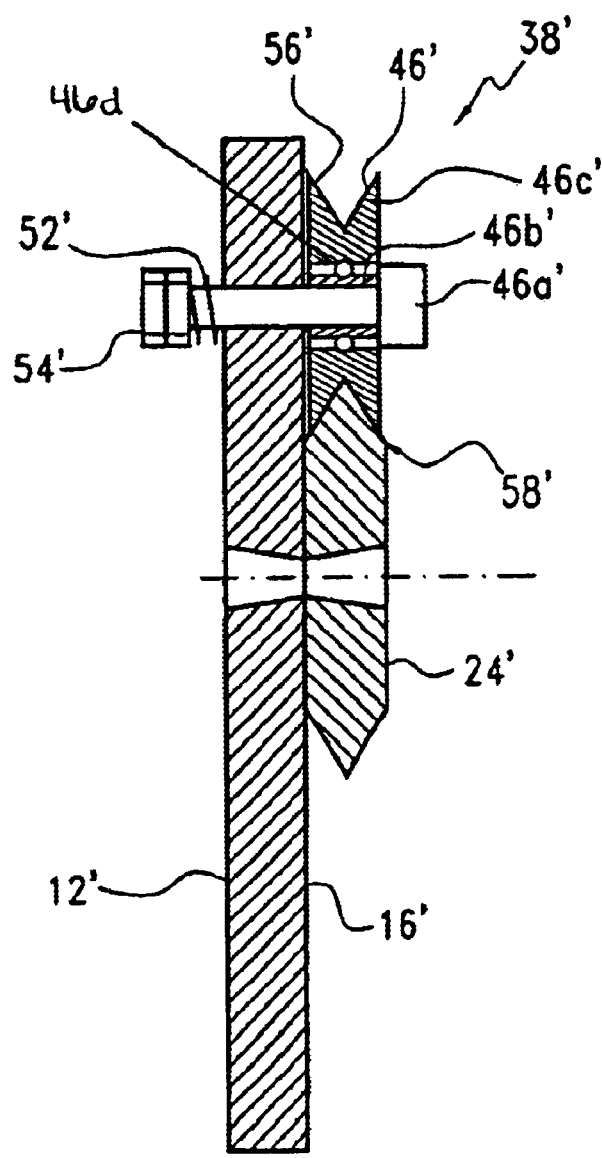
FIG. 8 is a cross sectional view of an alternate embodiment of the edge profiles for the support member and the second plate member.

While a plurality of bearing members with an outer ridge are disclosed in accordance with a preferred embodiment of the present invention, other bearing member designs may be employed without departing from the spirit of the present invention. For example, and with reference to FIG. 8, the edge profiles 56', 58' of the bearing members 46' and the second plate member 24' may be constructed for secure engagement by providing these components with interlocking edge profiles 56', 58' ensuring secure engagement between the bearing members 46' and the second plate member 24'. More specifically, the bearing members 46' of this embodiment are constructed with a pivot screw 46a', inner race 46b' and outer race 46c'. The inner race 46b' and the outer race 46c' are linked via ball bearings 46d' so as to provide for free rotation between the inner and outer races 46b', 46c'. As with the other embodiments, the support member 38' is biased to draw the second plate member 24' toward the first plate member 12', ensuring that a zero gap exists between the first and second plate members 12', 24'. A spring 52' is positioned between the retaining nut 54' and the first plate member 12' to bias the bearing member 46' toward the back face 16' of the first plate member 12'.

In addition, and as disclosed in accordance with a preferred embodiment of the present invention, the cutting apparatus 10 is provided with three support members 38 equally positioned about the periphery of the second plate member 24. However, those skilled in the art will certainly appreciate that the number and position of support members may be varied without departing from the spirit of the present invention.

A fenestration or opening in the general shape of the article to be cut is fashioned through the first and second plate members 12, 24 so that the article to be cut can be placed into and through the first and second openings 22, 34. Although tapering of the openings 22, 34 is not required, the openings in accordance with a preferred embodiment of the present invention are tapered toward the center of the rotary torsion cutting apparatus 10 thereby allowing ease of insertion, a more precise cut, the elimination of burring and a more defined cutting edge should the need for periodic sharpening arise. That is, the first opening 22 is tapered outwardly as it extends between the back face 16 of the first plate member 12 and the front face 14 of the first plate member 12 and the second opening 34 is tapered outwardly as it extends between the front face 26 of the second plate member 24 and the back face 28 of the second plate member 24.

The present torsion cutting apparatus 10 employs a torsion severance method. That is, the openings 22, 34 and, consequently, the article to be cut, are located in the apparatus 10 such that the article's inertial center substantially coincides with the rotational axis 60 of the cutting apparatus 10. This eliminates the need for any offset between the first and second plate members 12, 24 as is required with traditional shearing devices. As mentioned above, only in the instance where the article being cut is circular will any offset be required. In such case, only a slight offset necessary to generate sufficient cutting action is required. FIG. 7 illustrates the cutting pattern generated with the present invention both in the case where a slight offset is required 72 and when the inertial center coincides the rotational axis 74.

Figures 4A, 4B, 4C:
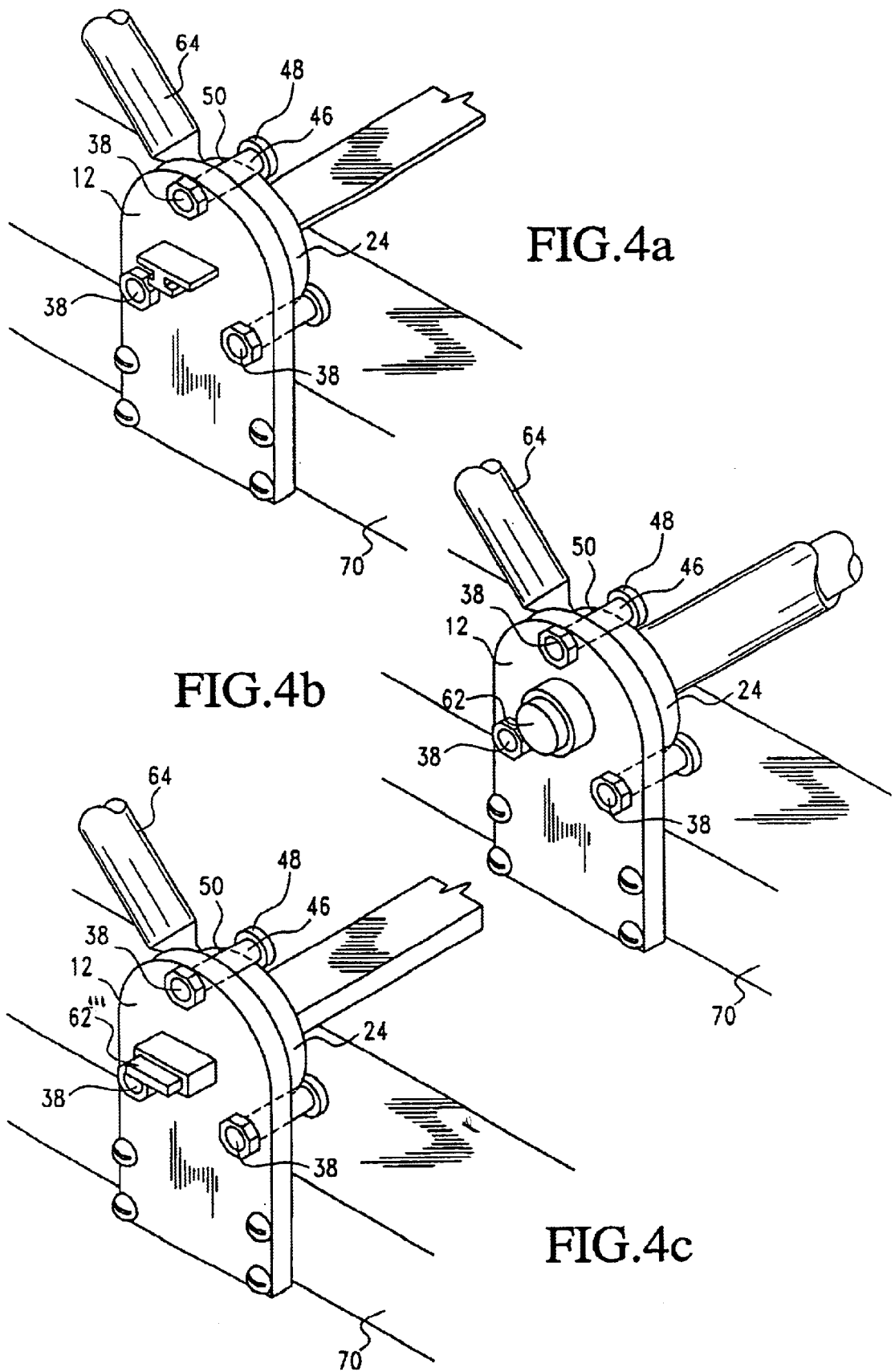
FIGS. 4a, 4b and 4c are perspective views showing the cutting apparatus utilized with articles having various cross sectional profiles.

In cases where a hollow article is to be cut, a solid insert 62, 62''' is placed within the article prior to cutting to eliminate deflection and deformation of the article walls. More particularly, and with reference to FIGS. 4b and 4c, an insert 62, 62''' is placed inside the article at the cutting point to facilitate the cutting of hollow articles such as copper tubes or PVC pipe. For example, FIGS. 4b and 4c respectively depict cutting stock that is either circular or rectangular in shape. FIGS. 4a, 4b and 4c illustrate examples of various cutting stock shapes cut with the apparatus of the present invention.

A variety of mechanisms for rotating the second plate member 24 have been contemplated for use in conjunction with the present cutting apparatus 10. In accordance with a preferred embodiment of the present invention, a handle 64 is attached to the second plate member 24 and the handle 64 is utilized in freely rotating the second plate member 24 relative to the first plate member 12. More specifically, the handle 64 is moved causing the second plate member 24 to rotate around the inertial center of the article being cut. The handle 64 is rotated sufficiently about the first and second openings 22, 34 to achieve the desired cut.

Figure 6:
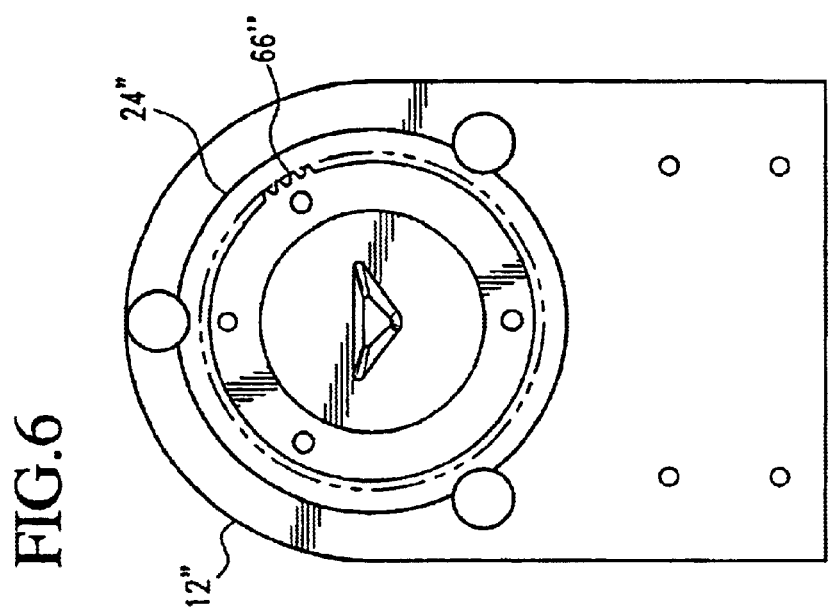
FIG. 6 is a front plan view of the cutting apparatus disclosed in accordance with FIG. 5.
Figure 5:
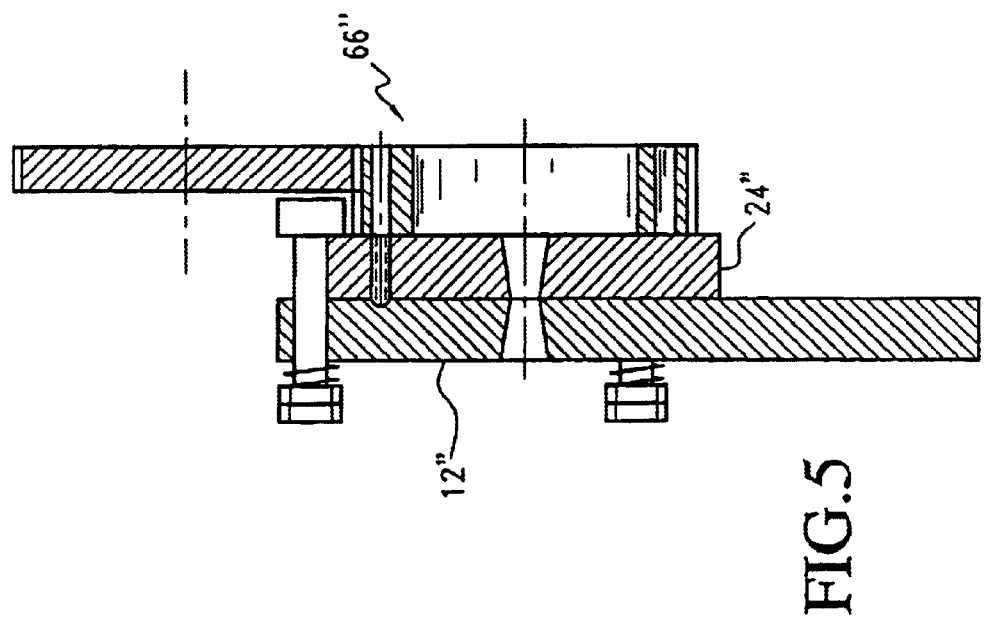
FIG. 5 is a cross sectional view of a cutting apparatus in accordance with an alternate embodiment.

Although a handle is disclosed in accordance with a preferred embodiment of the present invention, other conventional sources of mechanical, electrical, magnetic, hydraulic or pneumatic power may be employed within the spirit of the present invention. For example, and with reference to FIGS. 5 and 6, a gearing mechanism 66'' is shown for rotation of the second plate member 24'' relative to the first plate member 12''. It is further contemplated that a ratchet mechanism (not shown) may be employed in driving the cutting apparatus where clearance is not sufficient for the use of a handle. In addition, the apparatus may be provided with a one-way clutch for controlling movement of the second plate member relative to the first plate member.

The exact degree of rotation required will vary depending upon the material being cut in accordance with the present invention. For thin substantially rigid metals such as aluminum, it has been found that rotation of at least 90 degrees is required. However, softer materials, such as, rubbers, plastics, soft aluminums and soft steels, will require a greater degree of rotation approaching, or equaling, 360 degrees. Additional revolutions are possible, although it is contemplated that most materials will be fully severed within 360 degrees.

As mentioned above, the present cutting apparatus 10 is generally designed as a hand held, portable tool. The downwardly extending flange 68 of the first plate member 12 is adapted for attachment to a secure base 70. As those skilled in the art will certainly appreciate, the base may be constructed of any rigid material, such as, wood, metal, plastic, and the cutting apparatus may be secured thereto using any conventional attachment mechanism.

Shearing type cutting often results in rough or "burred" edges. The present cutting apparatus 10 eliminates burring by utilizing a zero gap between the first and second plate members 12, 24. Although a variety of structures may be utilized in fastening the first and second members 12, 24 for movement relative thereto, a series of support members 38 engage the side face 30 of the second plate member 24 in such a manner that the second plate member 24 is free to rotate in complete revolutions relative to the first plate member 12.

In use, an article for cutting is selected. The article should have the same profile as that defined by the first and second openings 22, 34. Prior to insertion of the article within the first and second openings 22, 34, the first and second openings 22, 34 are aligned through the utilization of the indexing device 40. Once properly aligned, the article is positioned within the first and second openings 22, 34 and aligned such that the proper length is cut therefrom. Thereafter, the second plate member 24 is rotated any angle sufficient to sever the article into two pieces, the first and second plate members 12, 24 are brought into alignment as defined by the indexing device 40 and the cut article is removed.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A rotary torsion cutting apparatus, comprising:
   a first plate member having a front face, a back face and a side face, the first plate member includes a central axis and a first opening extending from the front face to the back face of the first plate member, the first opening is shaped and dimensioned for receiving an article to be cut by the rotary torsion cutting apparatus;
   a second plate member having a front face, a back face and a side face, the second plate member includes a central axis aligned with the central axis of the first plate member and a second opening extending from the front face to the back face of the second plate member, the second opening is shaped and dimensioned for receiving an article to be cut by the rotary torsion cutting apparatus, wherein the second plate member is rotationally supported upon the first plate member for rotation relative thereto about a complete revolution;
   the first opening and the second opening are of substantially the same shape and are aligned for simultaneous positioning of an article within both the first opening and the second opening; and
   wherein relative movement between the first plate member and the second plate member causes a torsion cutting of an article positioned within the first opening and the second opening.

2. The rotary torsion cutting apparatus according to claim 1, wherein the first opening and the second opening are aligned with the central axis of the first plate member and the central axis of the second plate member such that the central axes of the first plate member and the second plate member extend through the first opening and the second opening.

3. The rotary torsion cutting apparatus according to claim 1, further including a fastening mechanism movably holding the back face of the first plate member in contact with the front face of the second plate member, wherein the fastening mechanism supports the first plate member relative to the second plate member such that the first opening is aligned with the second opening.

4. The rotary torsion cutting apparatus according to claim 1, further including a handle coupled to the second plate member for use in rotating the second plate member relative to the first plate member.

5. The rotary torsion cutting apparatus according to claim 1, wherein the first opening is tapered outwardly as it extends between the back face of the first plate member and the front face of the first plate member and the second opening is tapered outwardly as it extends between the front face of the second plate member and the back face of the second plate member.

6. The rotary torsion cutting apparatus according to claim 1, wherein the second plate member is cylindrical.

7. The rotary torsion cutting apparatus according to claim 1, wherein the first plate member is stationary and the second plate member rotates relative thereto, the central axis of the second plate member being aligned with an axis of rotation of the second plate member.

8. The rotary torsion cutting apparatus according to claim 7, further including a fastening mechanism movably holding the back face of the first plate member in contact with the front face of the second plate member such that a zero gap exists therebetween, wherein the fastening mechanism supports the first plate member relative to the second plate member such that the first opening is aligned with the second opening.

9. The rotary torsion cutting apparatus according to claim 8, wherein the fastening mechanism includes a plurality of support members extending from the first plate member and engaging the side face of the second plate member.

10. The rotary torsion cutting apparatus according to claim 9, wherein each support member includes an outer profile shaped and dimensioned for engaging the second plate member.

11. A rotary torsion cutting apparatus, comprising:
a first plate member having a front face, a back face and a side face, the first plate member includes a first opening extending from the front face to the back face of the first plate member, the first opening is shaped and dimensioned for receiving an article to be cut by the rotary torsion cutting apparatus;
a cylindrical, second plate member having a front face, a back face and a side face, the second plate member includes a second opening extending from the front face to the back face of the second plate member, the second opening is shaped and dimensioned for receiving an article to be cut by the rotary torsion cutting apparatus;
the first opening and the second opening are of substantially the same shape and are aligned for simultaneous positioning of an article within both the first opening and the second opening;
a fastening mechanism movably holds the back face of the first plate member in contact with the front face of the second plate member, the fastening mechanism includes a plurality of support members engaging the side face of at least one of the first plate member or the second plate member;
wherein relative movement between the first plate member and the second plate member causes a torsion cutting of an article positioned within the first opening and the second opening.

12. The rotary torsion cutting apparatus according to claim 11, further including a handle coupled to the second plate member for use in rotating the second plate member relative to the first plate member.

13. The rotary torsion cutting apparatus according to claim 11, wherein the back face of the first plate member faces the front face of the second plate member such that a zero gap exists between the first plate member and the second plate member.

14. The rotary torsion cutting apparatus according to claim 11, wherein each support member includes an outer profile shaped and dimensioned for engaging at least one of the first plate member or the second plate member.

15. The rotary torsion cutting apparatus according to claim 11, wherein the first opening is tapered outwardly as it extends between the back face of the first plate member and the front face of the first plate member and, the second opening is tapered outwardly as it extends between the front face of the second plate member and the back face of the second plate member.

16. The rotary torsion cutting apparatus according to claim 11, wherein the first plate member is stationary and the second plate member rotates relative thereto.

17. The rotary torsion cutting apparatus according to claim 16, wherein the support members extend from the first plate member and engage the side face of the second plate member.

18. The rotary torsion cutting apparatus according to claim 17, wherein each support member includes an outer profile which is shaped and dimensioned for engaging the second plate member.

* * * * *

UNITED STATES PATENT AND TRADEMARK OFFICE
CERTIFICATE OF CORRECTION

PATENT NO. : 6,840,146 B2
DATED : January 11, 2005
INVENTOR(S) : Anatoly Gosis et al.

It is certified that error appears in the above-identified patent and that said Letters Patent is hereby corrected as shown below:

<u>Title page,</u>
Item [73], Assignee, delete "Aremark" and insert in its place -- Premark --.

Signed and Sealed this

Twenty-fourth Day of May, 2005

JON W. DUDAS
*Director of the United States Patent and Trademark Office*